E. J. RUBRECHT & P. C. DEAN.
ATTACHMENT FOR HORSESHOES.
APPLICATION FILED MAR. 4, 1910.

958,547.

Patented May 17, 1910.

WITNESSES

INVENTORS
Emil J. Rubrecht
Patrick C. Dean

UNITED STATES PATENT OFFICE.

EMIL J. RUBRECHT AND PATRICK C. DEAN, OF PITTSBURG, PENNSYLVANIA.

ATTACHMENT FOR HORSESHOES.

958,547.  Specification of Letters Patent.  Patented May 17, 1910.

Application filed March 4, 1910.  Serial No. 547,223.

*To all whom it may concern:*

Be it known that we, EMIL J. RUBRECHT and PATRICK C. DEAN, citizens of the United States, residing at Pittsburg, in the county of Allegheny and State of Pennsylvania, have invented certain new and useful Improvements in Attachments for Horseshoes, of which the following is a specification.

Figure 2:
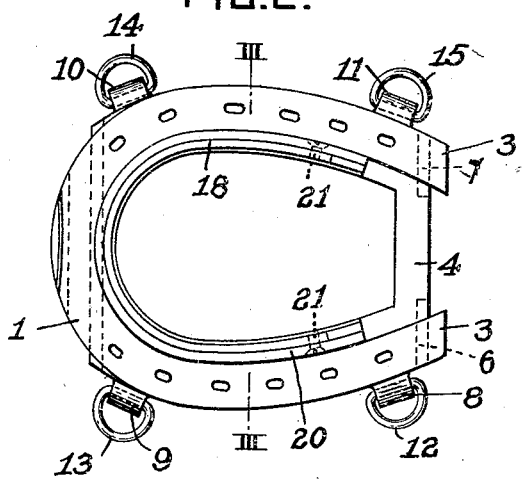
Figure 3:
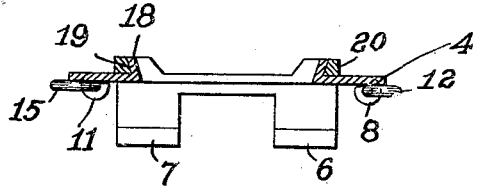
Figure 4:
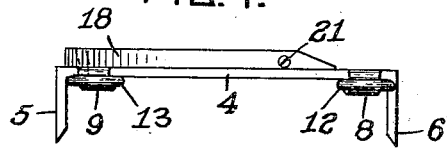

The invention relates to attachments for horseshoes designed primarily to be employed as emergency devices to prevent slipping when the streets are icy or otherwise slippery. The principal objects of the invention are the provision of an attachment which can be properly fitted to shoes of various sizes and which will be securely maintained in position without movement with respect to the shoe and without rattling; the provision of an attachment of durable construction which can be very cheaply made; and the provision of an attachment which will not spread and loosen upon the shoe. One form of the invention is illustrated in the accompanying drawings wherein, Figure 1 is a perspective view showing the attachment in position upon the horseshoe, Figure 2 is a plan view of a horseshoe with the attachment applied there beneath, Figure 3 is a section on the line III—III of Fig. 2, and Figure 4 is a side elevation of the attachment.

Heretofore attempts have been made to apply emergency shoes to horseshoes in the various ways, but such shoes have been in many cases unsatisfactory, due either to the expense of fitting the shoes to the horseshoe, or to the fact that it was difficult to make the fitting sufficiently exact and rigid to prevent relative movement between the emergency shoe and the horseshoe, and as a result rapid wear of the parts occurred combined with a great amount of rattling. My invention is designed to overcome these difficulties by providing a shoe which can be exactly and tightly fitted to the horseshoe with a very slight amount of effort, and so constructed that relative movement is practically eliminated, and the shoes are so spaced and separated that even in case of a slight relative movement, wear upon the metal parts of the shoes is avoided, and rattling is eliminated.

Figure 1:
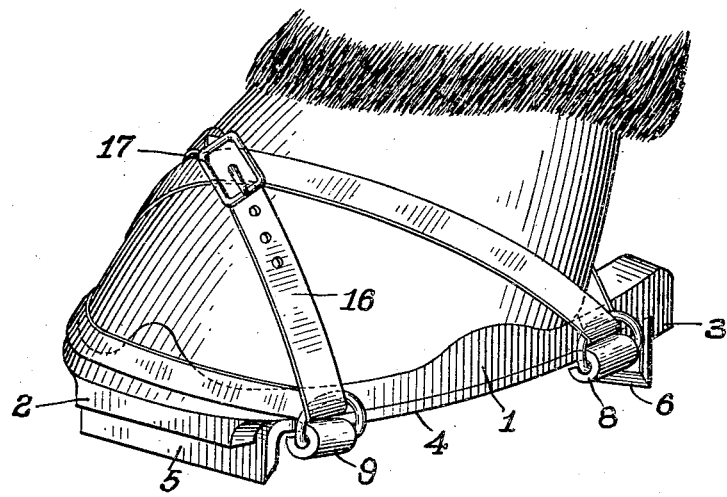

As illustrated in Fig. 1, 1 is an ordinary horseshoe nailed to the horse's hoof and provided with the usual calks 2 and 3. The attachment consists of a plate 4 approximately of the shape of the horseshoe, and provided at its front edge with the downwardly projecting calk 5 and at its rear edge with the calks 6 and 7. This plate 4 is preferably stamped from a sheet of metal with laterally projecting lugs integral therewith, which lugs are subsequently bent to form the holding clips 8, 9, 10 and 11 in which the rings 12, 13, 14 and 15 are loosely mounted. The attachment is preferably secured in place by means of the strap 16 passing through the loops 12, 13, 14 and 15 and about the hoof in the manner indicated in Fig. 1 the loose end of the strap being buckled at 17. The inner edge of the plate 4 is turned upward as indicated in Figures 2 and 3 to form a flange 18 for fitting inside of the horseshoe. This flange is preferably inclined so as to form an acute angle 19 with the upper face of the plate 4 as indicated in Fig. 3, the purpose being to form a dove tail for holding the packing material 20. This packing material 20 preferably comprises a fibrous band extending around the outer side face of the flange 18 and secured thereto by means of the set screws 21. These set screws taken in connection with the inclining of the flange serve to hold the band 20 very securely in position.

The band 20 is preferably made of a greater width than is necessary for the largest shoe with which it is to be used, so that in fitting the device to the horseshoe the band can be cut down to fit the inside of the shoe exactly. The band 20 is also made sufficiently thick to permit the use of one attachment with a number of different sized shoes, the band being of course, cut down to a greater extent with the smaller sized shoes. One size of attachment will not, of course fit all sizes of shoes, as the variation in size is too great, but by making a limited number of sizes and by proper cutting of the flexible band, an attachment can be secured which will fit any size of shoe. The attachment is in this manner not only made adjustable to fit various sizes and shapes of shoes, but is provided with a means which tends to deaden the noise incident to the relative movement of the attachment and the shoe and eliminate wear upon the metal portions of the attachment and avoid rattling. A much tighter fit can also be secured than is the case where metal fits against metal. Papier-mâché or sole leather are preferably used for the composition of the band, but obviously any material having similar properties might be substituted.

In order to keep the ends of the plates 4 from springing, the connecting bar 22 is provided. Considerable strain is imposed upon an attachment of this character, and there is a decided tendency, in the use of the device, of the ends of the plate 4 to work toward each other, thus bringing the flange with its packing material away from the inner surface of the shoe, and permitting the attachment to loosen upon the shoe. The bar 22 prevents this inward movement, and prevents any loosening of the attachment upon the shoe. It will be seen from the foregoing that the attachment fits practically the entire bottom surface of the shoe and that it can not injure the hoof to which it is applied.

Having thus described our invention and illustrated its use what we claim as new and desire to secure by Letters Patent is the following:—

1. An attachment for horseshoes, comprising a plate adapted to fit the lower face of a horseshoe and provided with downwardly projecting calks, an upstanding flange at the inner edge of the plate adapted to fit inside the horseshoe, relatively yielding packing means interposed between the flange and the inner edge of the horseshoe, and means for holding the plate against the horseshoe.

2. An attachment for horseshoes, comprising a plate similar in general contour to a horseshoe and provided with downwardly projecting calks, an upstanding flange extending along the inner edge of the plate and adapted to fit inside the horseshoe, a band of relatively yielding packing material secured to the outer face of the flange and adapted to engage the inner edge of the horseshoe, and means for holding the plate against the horseshoe.

3. An attachment for horseshoes, comprising a plate similar in general contour to a horseshoe and provided with downwardly projecting calks, an upstanding flange extending along the inner edge of the plate with its outer side face inclined at an acute angle to the face of the plate, a band of relatively yielding packing material secured against the inclined face of the flange and adapted to engage the inner edge of the horseshoe, and means for holding the plate against the horseshoe.

4. An attachment for horseshoes, comprising a plate similar in general contour to a horseshoe and provided with downwardly projecting calks, an upstanding flange extending along the inner edge of the plate with its outer side face inclined at an acute angle to the face of the plate, a band of relatively yielding packing material seated against the inclined face of the flange and adapted to engage the inner edge of the horseshoe, means for detachably securing the packing material to the said flange, and means for holding the plate against the horseshoe.

5. An attachment for horseshoes, comprising a plate similar in general contour to a horseshoe and provided with downwardly projecting calks, an upstanding flange extending along the inner edge of the plate and adapted to fit inside the horseshoe, a band of relatively yielding packing material secured to the outer face of the flange and adapted to engage the inner edge of the horse shoe, a supporting strut or bar interposed between the rear ends of the plate, and means for detachably securing the plate against the horseshoe.

In testimony whereof, we have hereunto signed our names in the presence of these two subscribed witnesses.

EMIL J. RUBRECHT.
PATRICK C. DEAN.

Witnesses:
  IDA MAY BLAINE,
  L. A. MYERS.